(12) United States Patent
Chang (10) Patent No.: US 7,219,834 B2
(45) Date of Patent: May 22, 2007

(54) SYSTEM AND METHOD FOR TRACKING INSTALLED EQUIPMENT AND DEPLOYING SPARE PARTS

(75) Inventor: Louis Chang, Toronto (CA)

(73) Assignee: Footprint Systems Inc., Toronto (CA)

( * ) Notice: Subject to any disclaimer, the term of this patent is extended or adjusted under 35 U.S.C. 154(b) by 233 days.

(21) Appl. No.: 10/980,324

(22) Filed: Nov. 4, 2004

(65) Prior Publication Data

US 2006/0091207 A1    May 4, 2006

(51) Int. Cl.
| | |
|---|---|
| G06K 5/00 | (2006.01) |
| G06F 19/00 | (2006.01) |
| G06F 7/00 | (2006.01) |
| G06Q 30/00 | (2006.01) |
| G06Q 90/00 | (2006.01) |
| G08B 13/14 | (2006.01) |
| G08B 29/00 | (2006.01) |
| G05B 19/00 | (2006.01) |
| G05B 23/00 | (2006.01) |
| G08C 19/00 | (2006.01) |
| H04B 1/00 | (2006.01) |
| G04B 3/00 | (2006.01) |
| H04Q 1/00 | (2006.01) |
| H04Q 9/00 | (2006.01) |

(52) U.S. Cl. ............... 235/380; 235/385; 340/572.1; 340/5.92

(58) Field of Classification Search ............ 235/380, 235/385; 340/572.1, 5.92
See application file for complete search history.

(56) References Cited

U.S. PATENT DOCUMENTS

| | | | | |
|---|---|---|---|---|
| 5,737,710 A | * | 4/1998 | Anthonyson | 701/1 |
| 5,745,049 A | * | 4/1998 | Akiyama et al. | 340/870.17 |
| 5,949,335 A | * | 9/1999 | Maynard | 34/572.1 |
| 5,969,260 A | * | 10/1999 | Belk et al. | 73/773 |
| 6,249,227 B1 | * | 6/2001 | Brady et al. | 340/572.1 |
| 6,667,690 B2 | * | 12/2003 | Durej et al. | 340/572.1 |
| 6,806,813 B1 | * | 10/2004 | Cheng et al. | 340/825.49 |
| 6,840,445 B2 | * | 1/2005 | Gatz | 235/385 |
| 6,847,856 B1 | * | 1/2005 | Bohannon | 700/115 |
| 6,943,683 B2 | * | 9/2005 | Perret | 340/538 |
| 6,954,688 B2 | * | 10/2005 | Katou | 701/29 |
| 6,999,861 B2 | * | 2/2006 | Katou | 701/29 |
| 7,042,358 B2 | * | 5/2006 | Moore | 340/572.1 |
| 7,042,360 B2 | * | 5/2006 | Light et al. | 340/572.1 |
| 7,053,775 B2 | * | 5/2006 | Moore | 340/572.1 |
| 2003/0111525 A1 | * | 6/2003 | Sweeney et al. | 235/376 |
| 2003/0120677 A1 | * | 6/2003 | Vernon | 707/102 |
| 2005/0030194 A1 | * | 2/2005 | Cheng et al. | 340/825.49 |

(Continued)

Primary Examiner—Daniel Walsh
(74) Attorney, Agent, or Firm—Fasken Manineau DuMoulin LLP (57) ABSTRACT

There is disclosed a system and method of tracking installed equipment and deploying spare parts. In an embodiment, each piece of equipment may includes a unique electronic identifier configured to be accessible over a data network, and accessible locally via a RFID (Radio Frequency IDentification) network. The unique identifier may be read utilizing a RFID reader of known geographic location. Any installed equipment and spare parts deployed in the vicinity of the RFID reader may be identified by their respective unique identifiers, and their geographic location may be tracked and collected at a networked data collection server. Status information for each unit of installed equipment may also be tracked and correlated with the geographic location at the data collection server. Spare parts may be deployed, or redeployed, based on the collected status information for each unit, and the geographic location as identified by the RFID reader.

16 Claims, 4 Drawing Sheets

U.S. PATENT DOCUMENTS

| | | |
|---|---|---|
| 2005/0068169 A1* | 3/2005 | Copley et al. ......... 340/539.13 |
| 2005/0280511 A1* | 12/2005 | Yokoyama et al. ........ 340/10.5 |
| 2006/0022801 A1* | 2/2006 | Husak et al. .............. 340/10.5 |
| 2006/0033606 A1* | 2/2006 | Howarth et al. ........... 340/10.1 |
| 2006/0067249 A1* | 3/2006 | Poustchi et al. ............ 370/260 |
| 2006/0091207 A1* | 5/2006 | Chang ........................ 235/385 |
| 2006/0091999 A1* | 5/2006 | Howarth .................... 340/10.3 |
| 2006/0103504 A1* | 5/2006 | Vassallo .................... 340/5.92 |
| 2006/0139149 A1* | 6/2006 | Faro et al. ................. 340/5.73 |
| 2006/0152338 A1* | 7/2006 | Hsu ............................ 340/5.5 |
| 2006/0164246 A1* | 7/2006 | Ghosh ..................... 340/572.1 |
| 2006/0229928 A1* | 10/2006 | Nix ............................... 705/9 |
| 2007/0001850 A1* | 1/2007 | Malone et al. ........... 340/572.1 |
| 2007/0008129 A1* | 1/2007 | Soliman ................... 340/572.1 |

* cited by examiner

SYSTEM AND METHOD FOR TRACKING INSTALLED EQUIPMENT AND DEPLOYING SPARE PARTS

FIELD OF THE INVENTION

The present invention generally relates to a system and method for tracking installed equipment and deploying spare parts for servicing thereof

BACKGROUND

With increasing competition, and rising expectations from customers, information technology (IT) and network equipment vendors are offering service level agreements (SLAs) that commit them to certain response times to repair installed equipment or deliver spare parts. The time-to-deliver or time-to-repair commitments in the SLAs may vary depending on the level of service selected by the customer, and the proximity of the installed equipment to the closest vendor authorized service center or spare parts depot. For example, equipment running critical applications may require on-site spare parts and 24 hours by 7 days technical support. In this case, the time-to-repair commitment may stipulate on-site repair within a specified number of hours, or less. For equipment running less critical applications, or for equipment installed at sites that are more distant from a service center or an off-site spare parts depot, the stipulated time-to-repair may be increased.

However, even with these SLA agreements in place, many IT and network equipment vendors do not have a viable and cost-effective method of tracking installed equipment and deployed spare parts in a timely and accurate manner. Often, the last location of the equipment known to the vendor is the ship-to-address on the invoice, which may or may not be the installed location. Compounding the problem is the changeability of today's businesses, with mergers and acquisitions, spin-offs, and other business transformations resulting in significant changes to IT and network infrastructure, often without knowledge of the equipment vendor. Often based on unreliable or outdated information, the equipment vendor's service resources and spare parts inventory may be ineffectively deployed, leading to failures in meeting SLA commitments, customer dissatisfaction, and possible penalties under the SLA for non-compliance.

A more effective method and system for tracking installed equipment and effectively deploying spare parts for servicing the equipment is desirable.

SUMMARY

The present invention relates to a system and method of tracking installed equipment and deploying spare parts. Each piece of installed equipment and each spare part has a unique identifier that may be used for tracking purposes. In an embodiment, the unique identifier may be an electronic identifier configured to be accessible over a data network, and accessible locally via a RFID (Radio Frequency IDentification) network. A RFID transponder may be used to store the unique identifier. The unique identifier may then be read utilizing a compatible RFID reader of known geographic location. Any installed equipment and spare parts deployed in the vicinity of the RFID reader may be identified by their respective unique identifiers, and their geographic location may be tracked and collected at a networked data collection server. Status information for each unit of installed equipment may also be tracked and correlated with the geographic location at the data collection server. Spare parts may be deployed, or redeployed, based on the collected status information for each unit, and the geographic location as identified by the RFID reader.

In an aspect of the present invention, there is provided a method of tracking installed equipment on a network and spare parts for servicing the installed equipment, the method comprising: identifying, via a reader of known geographic location, a unique identifier for each piece of equipment within the reader's range; collecting, through the network, the unique identifier and status information indicative of an operational status of each piece of equipment; and correlating, based on the unique identifier, the geographic location of each piece of equipment and the status information indicative of the operational status of each piece of equipment.

In an embodiment, the method further comprises utilizing an electronic tag for the unique identifier.

In another embodiment, the electronic tag is an Electronic Product Code (EPC).

In another embodiment, the method further comprises utilizing a radio frequency identification (RFID) transponder to store the EPC.

In another embodiment, the method further comprises detecting the RFID transponder utilizing an RFID reader.

In another embodiment, the method further comprises: deploying spare parts in geographic proximity to the installed equipment in dependence upon the correlated geographic location and status information for each piece of equipment.

In another embodiment, the status information comprises one of total operational time and fault signals generated by each piece of equipment.

In another embodiment, the method further comprises generating an alarm for replacement of an installed piece of equipment with a corresponding spare part upon occurrence of a replacement indication event.

In another embodiment, the replacement indication event is one of a piece of equipment reaching a predetermined point of its designed operational life, and the frequency of fault signals generated by a piece of equipment exceeding a predetermined threshold.

In another embodiment, the method further comprising, redeploying the spare parts in dependence upon the updated status information.

In another aspect of the invention, there is provided a system for tracking installed equipment on a network and spare parts for servicing the installed equipment, comprising: means for identifying, via a reader of known geographic location, a unique identifier for each piece of equipment within the reader's range; means for collecting, through the network, the unique identifier and status information indicative of an operational status of each piece of equipment; and means for correlating, based on the unique identifier, the geographic location of each piece of equipment and the status information indicative of the operational status of each piece of equipment.

In an embodiment, the unique identifier is an electronic tag.

In another embodiment, the electronic tag is an Electronic Product Code (EPC).

In another embodiment, the system further comprises a radio frequency identification (RFID) transponder to store the EPC.

In another embodiment, the system further comprises a RFID reader to detect the RFID transponder.

In another embodiment, the system further comprises: means for deploying spare parts in geographic proximity to the installed equipment in dependence upon the correlated geographic location and status information for each piece of equipment.

In another embodiment, the status information comprises one of total operational time and fault signals generated by each piece of equipment.

In another embodiment, the system further comprises means for generating an alarm for replacement of an installed piece of equipment with a corresponding spare part upon occurrence of a replacement indication event.

In another embodiment, the replacement indication event is one of a piece of equipment reaching a predetermined point of its designed operational life, and the frequency of fault signals generated by a piece of equipment exceeding a predetermined threshold.

In another embodiment, the system further comprises means for redeploying the spare parts in dependence upon the updated status information.

These and other aspects of the invention will become apparent from the following more particular descriptions of exemplary embodiments of the invention.

BRIEF DESCRIPTION OF THE DRAWINGS

In the figures which illustrate exemplary embodiments of the invention.

DETAILED DESCRIPTION

In recent years, special asset management systems have been developed in order to help IT personnel manage a large installed base of IT equipment. Commonly referred to as IT asset management (ITAM) systems, these management systems are typically configured to keep an inventory of IT assets connected to an IT network infrastructure, for the purposes of managing their operation and their security.

ITAM systems are designed to identify and catalog equipment connected to an organization's network, and optionally to catalog software files resident on the equipment. ITAM systems may span the entire corporate network, and may be topology and operating system independent. Information collected by an ITAM system may be stored in a database or repository where it can later be extracted and manipulated by IT personnel responsible for maintaining the IT infrastructure. More capable ITAM systems may provide enhanced functions such as reconciling the number of licensed software titles installed with the actual number of copies in use, alerting management when unknown systems access the network, identifying specific leased systems which are due to be returned, and interfacing with organizational personnel to efficiently resolve IT related problems for specific users.

Some ITAM systems may also employ auto-discovery features to find devices located on the network. A common protocol used for this purpose is the Simple Network Management Protocol (SNMP). Using SNMP, a unique identifier may be applied to each unit of installed equipment so that physical, media access control (MAC) and internet protocol (IP) addresses can be tracked. However, this type of tracking only provides a logical location relative to the known network infrastructure. Such tracking information, if made available by the customer at all, lacks specific geographic location information.

Furthermore, as ITAM systems are often proprietary, and implemented specifically for each customer's particular IT infrastructure, they generally do not serve well as a standardized asset tracking tool for equipment vendors. Such attempts will often require significant negotiations on both sides, and intense labour to perform frequent on-site audits and taking of inventory of installed equipment.

Given these limitations of ITAM systems, a new approach to tracking installed equipment and spare parts is necessary. To this end, the present invention combines, in part, the useful features of ITAM technology with developing electronic labelling standards to provide a more cost effective solution for tracking installed equipment and spare parts.

As known by those skilled in the art, machine readable product labelling is commonly implemented by using an optical bar code label placed on the surface of a device. The bar code label is readable by a compatible optical bar code reader for product identification purposes. A type of optical bar code label commonly in use is the UPC (Universal Product Code). A unique UPC is found on many packaged products to allow retailers and wholesalers to keep track of their product inventories in the supply chain. Data scanned by the optical barcode reader is usually transmitted to one or more back-end systems for inventory and logistics management.

In a retail context, use of the UPC is seldom extended beyond the point-of-sale. In some cases, the UPC may also be utilized for post-sales product registration, servicing and support. For example, as part of a post-sale "on-line" product registration process on the internet, a consumer may be asked to enter the UPC found on the product being registered. However, as post-sale product registration is typically at the discretion of the customer, and subject to human data entry error, the integrity of the registration database is often questionable, and generally cannot be relied on for the purposes of SLA compliance.

To overcome the limitations of conventional UPC labelling, the present invention incorporates use of electronic labelling technology. One emerging standard in electronic labelling is the EPCglobal Network standard. The EPCglobal Network extends RFID technology with an electronic product code (EPC), which is designed to replace the conventional UPC. Recently, EPC has been adopted by certain major manufacturers, retailers and their suppliers to track the movement of goods in their supply-chain.

Recognizing the useful features of ITAM, as discussed above, and the advantages of electronic labelling technology, the inventor has designed a new system and method of tracking the geographical locations of installed equipment and deploying spare parts.

Figure 1:
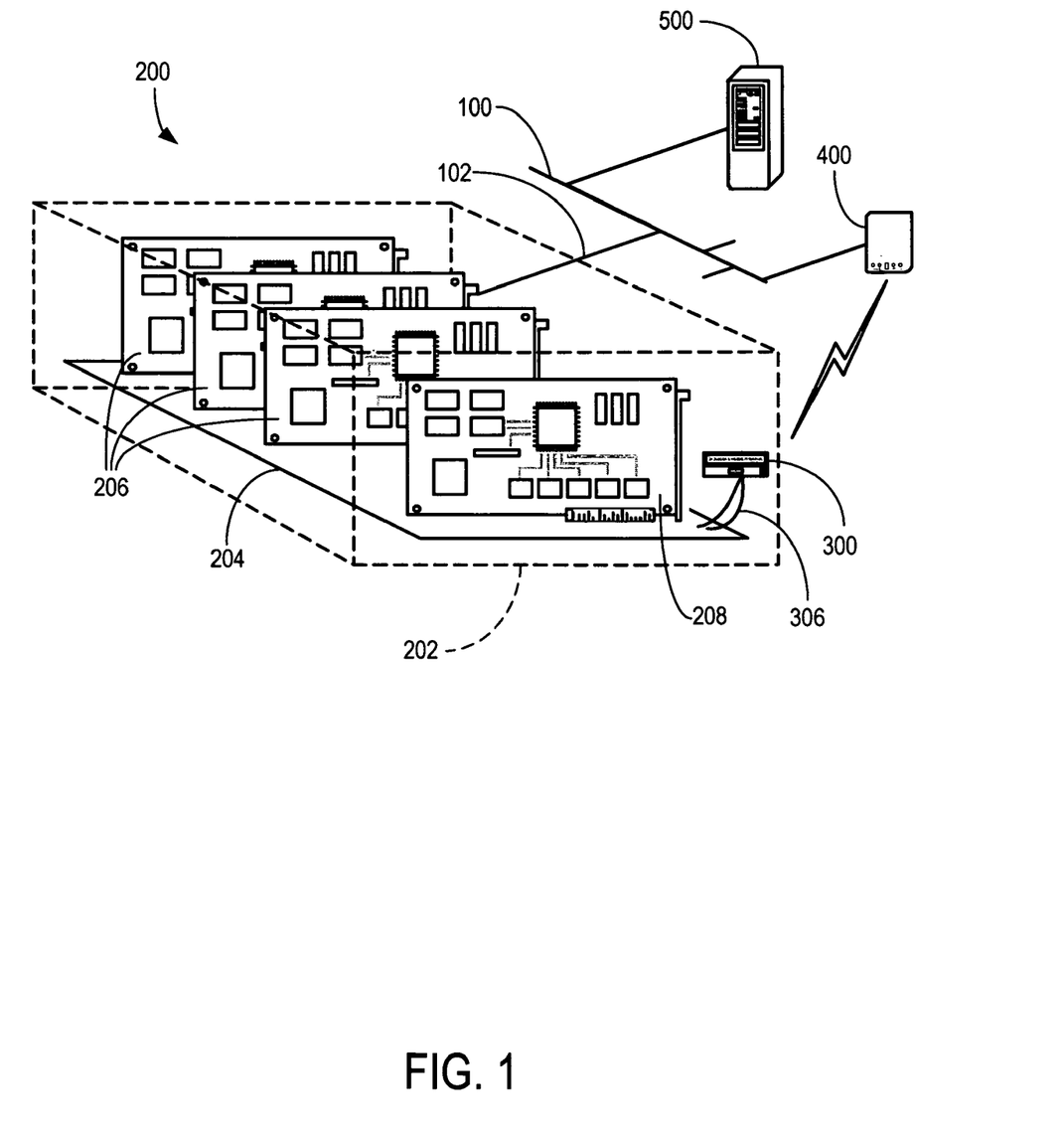
FIG. 1 shows an illustrative example of a device with installed equipment and unique identifiers configured to be accessible over a data network and locally via RFID network.

By way of illustration, FIG. 1 shows a device 200 connected by network link 102 to network 100. Device 200 may comprise a chassis 202 enclosing a backplane 204 with multiple components installed thereon. For example, the installed components may include a plurality of line cards 206 and a processor card 208. Each of the components 206, 208 may have a unique identifier or UIC stored on non-volatile memory on each component 206, 208.

In an embodiment, a RFID transponder 300 may be embedded on chassis 202 of device 200 at the time of manufacture of device 200. However, to support an existing installed base of devices that do not have the embedded RFID transponder 300, different form factors (e.g. PCM-CIA, USB, RS232, smart card, etc.) of the RFID transponder 300 may be configured as integratable add-ons.

Figure 2:
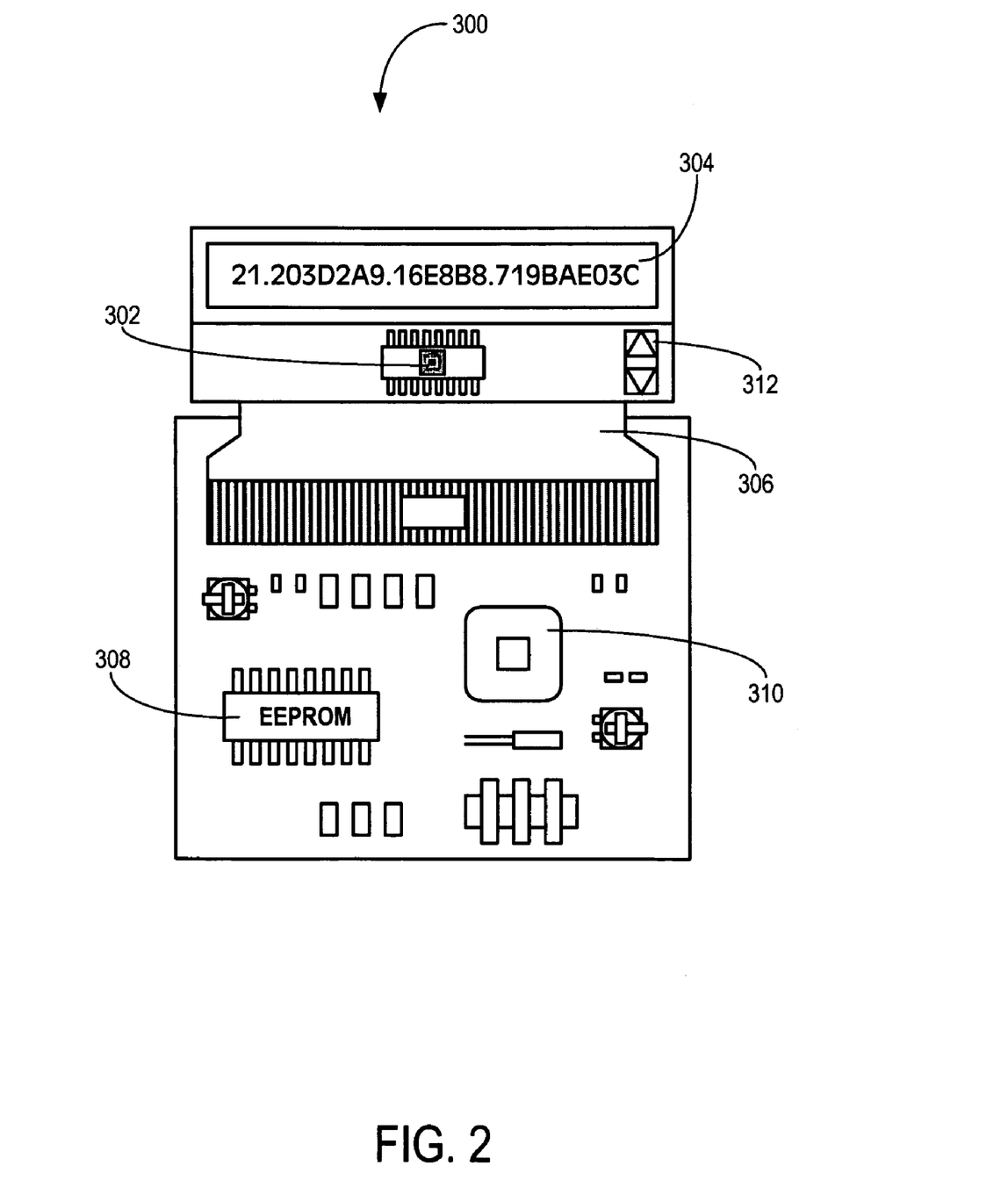
FIG. 2 shows a more detailed view of a RFID transponder that may be used in the device of FIG. 1.

FIG. 2 shows a more detailed view of an illustrative example of a RFID transponder 300. As shown, RFID transponder 300 may include an RFID chip 302 with integrated circuitry. An LCD display 304 may be used to display unique identifier values (e.g. UIC values) of components installed in chassis 202. On the inside of chassis 202, RFID transponder 300 may be connected via circuitry 306 and backplane 204 to processor card 208 and to line cards 206. An electrically erasable programmable memory (EEPROM) 308 may be used to store a map of unique identifier values collected by RFID transponder 300.

RFID transponder 300 may include a microprocessor 310 to run system drivers and controller software to interrogate each component 206, 208 and to assemble a map of unique identifiers. This map of unique identifiers may be read by a compatible RFID reader 400. Scroll buttons 312 may be provided to scroll through the list of unique identifiers in LCD display 304.

Preferably, RFID transponder 300 should be of the "active" type that may be powered and configured to achieve a significant transmission range. For example, in a typical large installation site, a transmission range of at least 100 feet may be required. In an embodiment, RFID transponder 300 may contain its own battery for long range transmission. However, batteries generally provide only a limited lifespan. For devices that are designed to stay operational for many years, battery power may not be suitable. Therefore, more preferably, RFID transponder 300 may be configured to draw power from the power supply of device 200. In addition, any added cost of providing this capability to draw power from device 200 may be offset by savings in reducing the number of RFID readers 400 required to cover the installation site.

In the present illustrative example, RFID transponder 300 is exposed on the outside of chassis 202 and is readable by a fixed RFID reader 400 of known geographic location. The RFID reader 400 may read the unique identifiers of installed components collected by RFID transponder 300 and transmit the unique identifiers, along with the geographical location of device 200, to a data collection server 500. For the purposes of the present description, this type of wireless RFID tracking may be referred to as "out-of-band" tracking.

As each component 206, 208 in the device 200 has its own embedded unique identifier (e.g. UIC), a software agent may be used to assemble a map of component parts of the device and forward this information over the network 100 to data collection server 500. For the purposes of the present description, this type of network based tracking may be referred to as "in-band" tracking.

As will be seen, data collection server 500 may receive the unique identifier information independently from both RFID reader 400 (out-of-band tracking) and over network 100 from device 200 (in-band tracking). At data collection server 500, the unique identifier (e.g. UIC) of each piece of installed equipment is the common key that may be used to correlate the geographical location of the device with status information obtained from in-band tracking. Use of such a common unique identifier for both in-band and out-of-band tracking assures that the status and identification information is correctly correlated. The correlated information is then store in a database or repository for further processing.

Data collection server 500 may itself be part of a larger systems and network management network used to manage a high volume of in-band device registration and out-of-band reader events typical in large-scale networks. Data collection server 500 may provide an open application programming interface (API) for integration to other management systems existing in the customer's IT infrastructure. Such an API may allow the geographical location information of devices stored in data collection server 500 to be retrieved and utilized in other applications.

From an architectural perspective, the tracking solution described above should be scalable to support very large networks with multiple locations and millions of pieces of installed equipment and spare parts. While it is possible to practice the present invention using a proprietary electronic code labelling solution, it will be appreciated that economies of scale may be achieved by adapting or conforming to a standard where possible. By conforming to such an open standard, the present solution allows a vendor or service provider to implement a standardized system for various customers without the need for extensive customization.

One emerging standard for electronic product codes is the architecture known as the EPCglobal Network, developed through a joint venture between EAN International and the Uniform Code Council (UCC). The EPCglobal Network comprises a distributed architecture of components, as described below. (As the EPCglobal Network standard is still evolving, some of the components described below may change, or be replaced by a more recently developed component.)

A first component of the EPCglobal Network is the EPC-IS (Electronic Product Code—Information Service). EPC-IS keeps all of the data regarding EPC, whether static, instance-level or temporal. PML or Physical Markup Language, such as XML, with XQL query structure is used to allow structured querying and reporting.

Another component of the EPCglobal Network is the ONS (Object Name Service). This is a distributed resource that knows where information about EPCs is being held (similar to the way in which DNS can identifies website URLs).

Another component of the EPCglobal. Network is Application Level Events (ALE) ALE provides applications with filtered and aggregated EPC data from multiple real-time sources. ALE is expressed in declarative query language and provides synchronous ("pull") and asynchronous ("push") data flow. ALE insulates applications from reader configuration and naming.

Yet another component is the electronic product code (EPC), which may be used as the "unique identifier". An EPC may be carried by a data carrier and associated with each unique piece of equipment, providing a specific pointer permitting enquiries about a specific piece of equipment associated with the EPC.

Still another component is the reader, or a data capture device used to read the EPC. The reader may be portable or fixed (i.e. installed), and may be connected to a ALE or the installation network.

For further information in the EPCglobal Network, the reader is directed to specifications as published by EPCglobal.

In an embodiment, the present invention may be practiced using an electronic code architecture that is similar to the EPCglobal Network architecture described above. For example, each piece of installed equipment may be provided at the time of manufacture with an EPC as a unique identifier. EPCglobal Network's architecture includes a Reader Protocol (e.g. Auto-ID Reader Protocol 1.0), which defines the wire protocol by which RFID readers interact with Auto-ID compliant software applications.

Using the Reader Protocol, and ALE specifications, software agents may be used to interrogate and assemble EPC maps of installed components on each device. As well, the ONS infrastructure may be adapted to enable global routing of EPCs to various data collection servers on the network. EPC-IS may then be adapted to collect at each data collection server the EPC data and location information from a plurality of readers of known geographic location. The collected EPC and location information may then be processed in a geographic information system (GIS) to produce a geographic map of a customer's installed base of equipment and deployed spare parts, if any. An example is now provided to illustrate how the present invention may be practiced.

EXAMPLE 1

Figure 3:
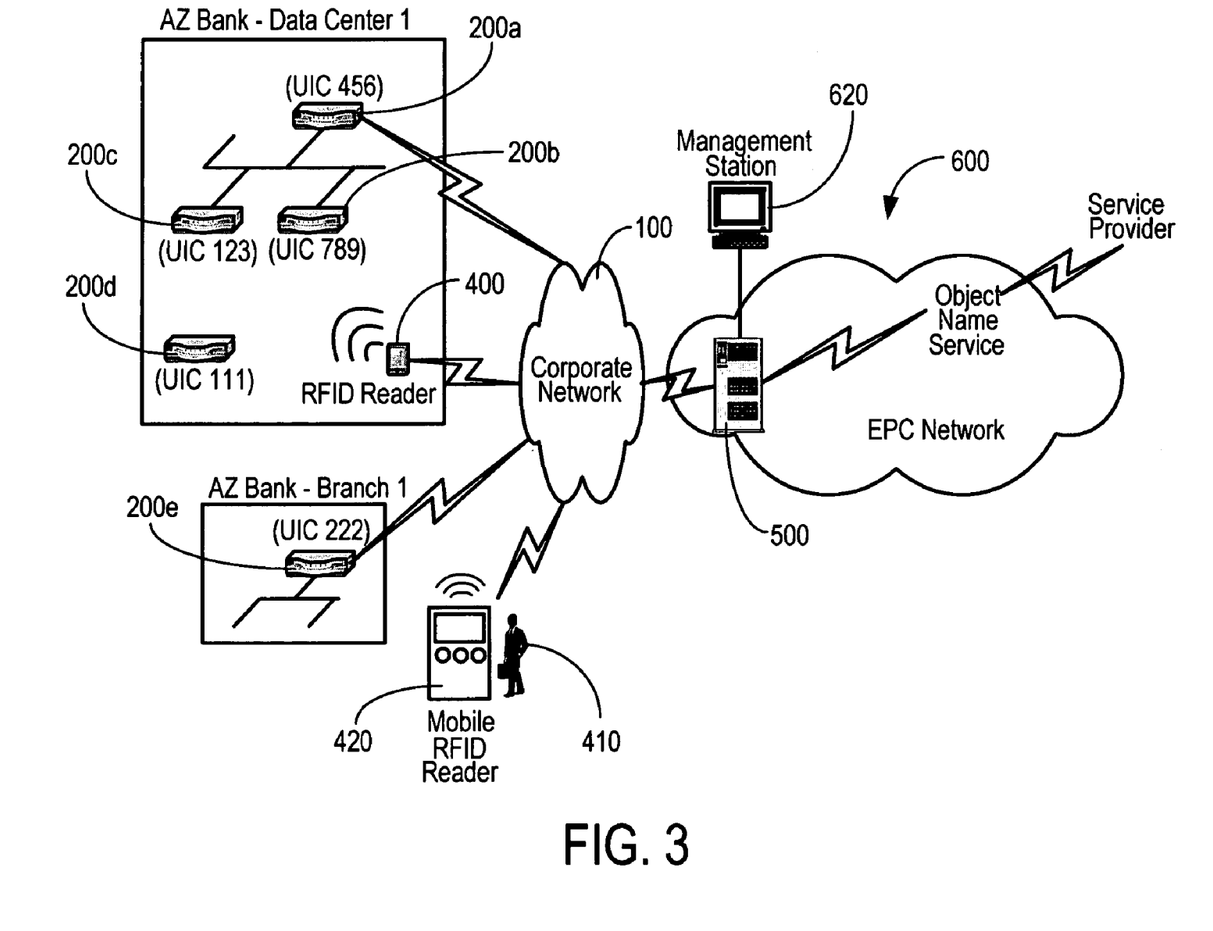
FIG. 3 illustrates a system for tracking geographical locations of installed equipment and spare parts in accordance with an embodiment of the invention.

FIG. 3 illustrates how vendor "X" may track the geographic locations of installed equipment at various locations of customer "AZ Bank".

(a) AZ Bank signs a SLA with vendor X to provide maintenance and support for its IT infrastructure. In exchange for vendor X's time-to-repair commitment, AZ Bank agrees to implement a data collection server 500 on its corporate network 100 and also deploys fixed RFID readers 400 in strategic locations (in this example, at the entrance of AZ Bank's Data Center 1).

(b) In this example, assume that customer AZ bank is installing a new device 200a at its Data Center 1. Device 200a from vendor X is embedded with an RFID chip 300 which stores a UIC of 456 (assigned at manufacturing). Device 200a is sold and shipped to AZ Bank. AZ Bank ships device 200a having UIC 456 to Data Center 1 for installation. As shown, Data Center 1 may already have other devices 200b, 200c installed at Data Center 1. An uninstalled spare device 200d remains on-site at Data Center 1. In this example, devices 200b, 200c, 200d store UIC 789, UIC 123 and UIC 111, respectively.

(c) Fixed-location RFID reader 400 previously installed at Data Center 1's entrance detects UIC 456 as device 220a enters its vicinity. RFID reader 400 sends UIC 456 along with its known geographic location to data collection server 500 over network 100. Data collection server 500 now has a record that device 200a with UIC 456 is at Data Center 1, but is offline.

(d) Next, device 200a with UIC 456 is installed and connected to network 100, either by vendor X's technician or AZ Bank's internal IT staff.

(e) Upon power-up of device 200a, associated controller software in device 200a reads UIC 456 and interrogates and assembles the device status. This information is then transmitted through device 200a's network connection on network 100 to data collection server 500.

(f) When device 200a sends the information as described above, data collection server 500 uses UIC 456 as a matching key to locate device 200a's record and updates device 200a to "on-line" status. The time-of-change, component list, etc. may also be updated. Data collection server 500 now has the current geographical location and updated status information for device 200a stored in a database.

(g) For remote or branch locations that do not justify the installation of fixed RFID reader 400, when a new device with an embedded RFID transponder is connected to the network 100, the power-up routine sends the UIC and device information over network 100 to data collection server 500. Data collection server 500 will then have a record of device 200e coming on-line on the network. However, its geographical location is unknown.

(h) To ensure SLA compliance, vendor X and AZ Bank may mutually agree to perform a regular inventory count by dispatching personnel 410 on-site with a mobile RFID reader 420 to update any unknown location in data collection server 500's database. Once detected at a particular location, the mobile RFID reader 420 may be used to send the UIC and location data to data collection server 500. The UIC can be used as a matching key to correlate the location information in the database.

(i) Uninstalled devices at Data Center 1 (e.g. spare part device 200d) are also detected by fixed RFID reader 400. At Branch 1, any uninstalled spare parts (none shown in this example) are detected by mobile RFID reader 420. Thus, a complete inventory of all installed devices and uninstalled spare parts are recorded in data collection server 500.

(j) Periodic reports from data collection server 500 are sent to vendor X's management station 620 at a pre-agreed interval (e.g. daily, weekly, monthly, etc.). Vendor X uses these periodic reports to update its service database and remap the geographic locations of installed devices at AZ Bank that are covered under the SLA. Vendor X is then able to proactively adjust its spare parts deployment to meet or exceed its time-to-repair commitment to AZ Bank.

TABLE 1

| UIC | Device Type | Time of Change | RFID Read | Location | Network | Status |
| --- | --- | --- | --- | --- | --- | --- |
| 123 | A111 | Mar. 3, 1999 | Y | DC1 | Online | UIC Map |
| 456 | A123 | Apr. 5, 2004 | Y | DC1 | Online | UIC Map |
| 789 | A123 | Nov. 8, 2002 | Y | DC1 | Online | UIC Map |
| 111 | B234 | N/A | Y | DC1 | Online | UIC Map |
| 222 | A111 | May 17, 2003 | Y | BR1 | Online | UIC Map |

As will be seen in Table 1, in-band and out-of-band correlation of device status with geographic location by using the "UIC" for each device 200 provides a complete set of tracking information stored in the data collection server 500, no further integration with an external system is required. Also, the current "Status" of each device 200 may be stored as shown in the right-most column.

Optionally, data collection server 500 may have an auto-discovery feature that vendor X and AZ Bank can mutually agree to activate, so that devices 200a–200e can be queried and updated at regular intervals, or upon an occurrence of a triggering event, to prevent any data lost due to previous transmission errors. This feature may also be useful for AZ Bank to identify rogue devices.

In the above Example 1, for installed devices 200 that do not have an embedded RFID transponder 300, a corresponding add-on RFID transponder 300 may be inserted into device 200 (e.g. in an available expansion slot of the device 200). System drivers and controller software loaded onto device 200 may then interface with the add-on RFID transponder 300 in a manner analogous to the embedded RFID transponder 300.

EXAMPLE 2

Figure 4:
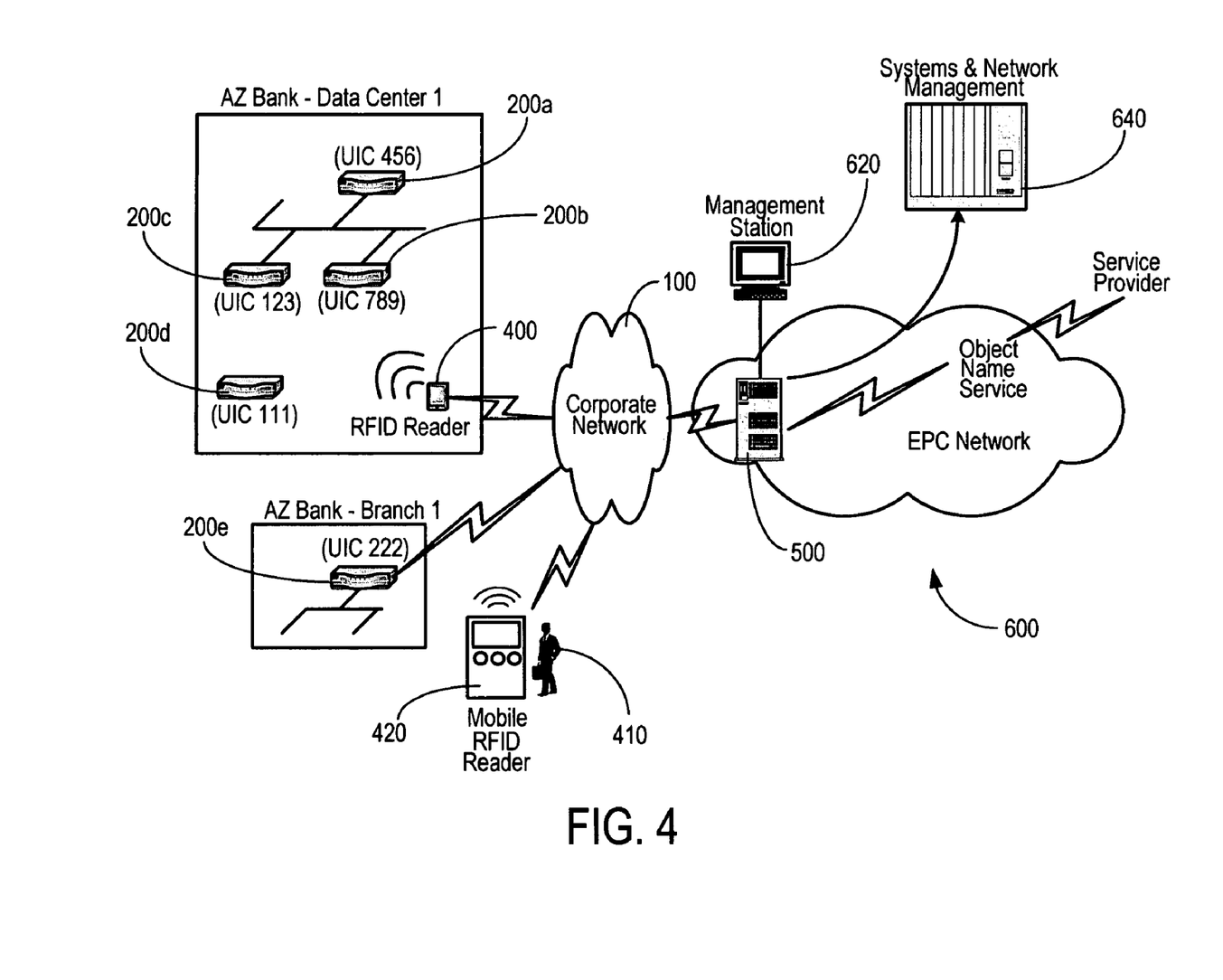
FIG. 4 illustrates a system for tracking geographical locations of installed equipment and spare parts in accordance with another embodiment of the invention.

Now referring to FIG. 4, Example 2 describes a possible way to handle legacy equipment installed on the network that does not have an embedded RFID chip 300, and that cannot accommodate an RFID chip 300 as an add-on. In this example, a conventional RFID tag may be attached to the chassis of legacy equipment by an adhesive or any other suitable means of attachment. In this example, the interaction between vendor X and customer AZ bank is as follows.

(a) AZ Bank signs a SLA with vendor X to provide maintenance and support for its IT infrastructure. In exchange for vendor X's time-to-repair commitment, AZ Bank agrees to implement the data collection server 500 on its corporate network and deploy RFID readers 400 in strategic locations (in this example, one at the entrance of Data Center 1). Vendor X also agrees to attach RFID transponders to all devices under SLA.

(b) Device 200a from vendor X is identified as UIC 456 and deployed to AZ Bank's Data Center 1.

(c) Fixed-location RFID reader 400 previously installed at Data Center 1's entrance detects device 200a with UIC 456 as device 200a enters its vicinity. RFID reader 400 sends UIC 456 with its geographic location to data collection server 500.

(d) Data collection server 500 now has a record that device 200a with UIC 456 is located at Data Center 1. However, data collection server 500 has no knowledge of network status, nor the ability to assemble a component list or inquire about the status of the device.

(e) For a remote or branch location that does not justify the installation of fixed RFID reader 400, devices will not be tracked by data collection server 500 until a manual RFID scan occurs.

(f) To ensure SLA compliance, vendor X and AZ Bank may mutually agree to perform regular inventory count by dispatching personnel 410 with a mobile RFID reader 420 on-site to update any unknown devices to the data collection server 500's database.

(g) Periodic reports from data collection server 500 are sent to vendor X's management station 620 in pre-agreed intervals (daily, weekly, monthly, etc. per SLA). Vendor X uses these periodic reports to update its service database and remap the geographic locations of installed devices at AZ Bank that are covered under the SLA. Vendor X is then able to proactively adjust its spare parts deployment to meet or exceed its time-to-repair commitment to AZ Bank.

(h) For correlation of a device's geographical location to its status information and configuration, systems integration is required to back-end systems & network management device 640.

In the case of Example 2, above, no in-band tracking occurs. Therefore, the device status is unknown to data collection server 500. This limitation is further illustrated in Table 2, below.

TABLE 2

| UIC | Device Type | Time of Change | RFID Read | Location | Network | Status |
|-----|-------------|----------------|-----------|----------|---------|--------|
| 123 | A111 | Mar. 3, 1999 | Y | DC1 | N/A | N/A |
| 456 | A123 | Apr. 5, 2004 | Y | DC1 | N/A | N/A |
| 789 | A123 | Nov. 8, 2002 | Y | DC1 | N/A | N/A |
| 111 | B234 | N/A | Y | DC1 | N/A | N/A |
| 222 | A111 | May 17, 2003 | Y | BR1 | N/A | N/A |

In Table 2, columns "Network" and "Status" have no known value. Therefore, in (h), above, it is assumed that the device status information may exist in other network management systems that the customer may have implemented. In order to obtain a complete correlation of geographic location, systems integration efforts are required. Since the identifiers used in data collection server 500 and the network management systems are separate, and may not match, it will be appreciated that correlation may be more error-prone.

In either of Example 1 or Example 2, described above, based on the status information collected at data collection server 500, vendor X may deploy or redeploy spare parts in geographic proximity to the installed equipment in dependence upon the correlated geographic location and status information for each piece of equipment.

By way of example, the status information may include total operational time of each piece of equipment. Based on the expected operational life of a device, a particularly critical piece of installed equipment may be pre-emptively replaced before the device reaches its expected end of life. An alternative is to measure the frequency of fault signals generated by each piece of equipment. If the frequency of fault signals exceeds a certain threshold, an alarm may be generated at management station 620 to pre-emptively replace a part that may fail in the near future. Such a replacement indication event may be agreed to as between the equipment vendor and customer. As will be appreciated, based on the operational status information for each piece of installed equipment, and the geographic location of the equipment, the equipment vendor may strategically deploy or redeploy spare parts in anticipation of an expected replacement indication event.

While various illustrative embodiments of the invention have been described above, it will be appreciated by those skilled in the art that variations and modifications may be made. Thus, the scope of the invention is defined by the following claims.

What is claimed is:

1. A method of tracking equipment installed on a network and spare parts for servicing said installed equipment, said method comprising: identifying, via a reader of known geographic location, a unique identifier for each piece of equipment with said reader's range; collecting, through said network, said unique identifier and status information indicative of an operational status of said each piece of equipment; correlating, based on said unique identifier, the geographic location of said each piece of equipment with said status information indicative of the operational status of said each piece of equipment; deploying spare parts in geographic proximity to said installed equipment in dependence upon said correlated geographic location and status information for said each piece of equipment upon occurrence of a replacement indication event comprising one of a piece of equipment reaching a predetermined point of its designed operational life, and the frequency of fault signals generated by a piece of equipment exceeding a predetermined threshold.

2. The method of claim 1, further comprising utilizing an electronic tag for said unique identifier.

3. The method of claim 2, wherein said electronic tag is an Electronic Product Code (EPC).

4. The method of claim 3, further comprising utilizing a radio frequency identification (RFID) transponder to store said EPC.

5. The method of claim 4, further comprising detecting said RFID transponder utilizing an RFID reader.

6. The method of claim 1, wherein said status information comprises one of total operational time and fault signals generated by said each piece of equipment.

7. The method of claim 6, further comprising generating an alarm for replacement of an installed piece of equipment with a corresponding spare part upon occurrence of a replacement indication event.

8. The method of claim 1, further comprising, redeploying said spare parts in dependence upon said updated status information.

9. A system for tracking equipment installed on a network and spare parts for servicing said installed equipment, said system comprising: means for identifying, via a reader of known geographic location, a unique identifier for each piece of equipment with said reader's range; means for collecting, through said network, said unique identifier and status information indicative of an operational status of said each piece of equipment; means for correlating, based on said unique identifier, the geographic location of said each piece of equipment with said status information indicative of the operational status of said each piece of equipment; means for deploying spare parts in geographic proximity to said installed equipment in dependence upon said correlated geographic location and status information for said each piece of equipment upon occurrence of a replacement indication event comprising one of a piece of equipment reaching a predetermined point of its designed operational life, and the frequency of fault signals generated by a piece of equipment exceeding a predetermined threshold.

10. The system of claim 9, wherein said unique identifier is an electronic tag.

11. The system of claim 10, wherein said electronic tag is an Electronic Product Code (EPC).

12. The system of claim 11, further comprising a radio frequency identification (RFID) transponder to store said EPC.

13. The system of claim 12, further comprising a RFID reader to detect said RFID transponder.

14. The system of claim 9, wherein said status information comprises one of total operational time and fault signals generated by said each piece of equipment.

15. The system of claim 9, further comprising means for generating an alarm for replacement of an installed piece of equipment with a corresponding spare part upon occurrence of a replacement indication event.

16. The system of claim 9, further comprising, means for redeploying said spare parts in dependence upon said updated status information.

* * * * *